Aug. 18, 1959 R. E. LIDOV 2,900,420
PREPARATION OF POLYCHLORO-ALICYCLIC COMPOUNDS
Filed July 22, 1957
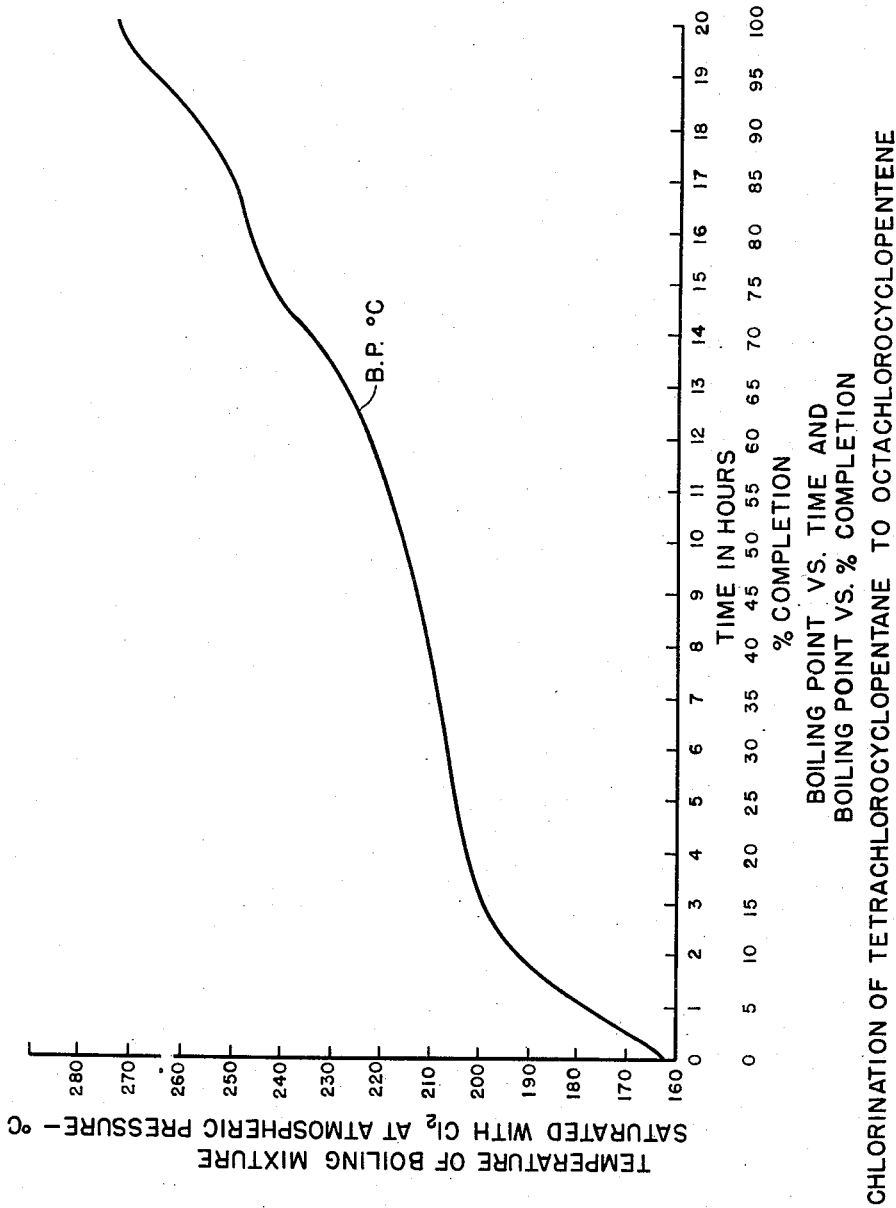
INVENTOR:
REX E. LIDOV
BY:
HIS AGENT

United States Patent Office 2,900,420
Patented Aug. 18, 1959

2,900,420

PREPARATION OF POLYCHLORO-ALICYCLIC COMPOUNDS

Rex E. Lidov, Great Neck, N.Y., assignor to Shell Development Company, New York, N.Y., a corporation of Delaware Application July 22, 1957, Serial No. 673,475

11 Claims. (Cl. 260—648)

This invention relates to processes for the preparation of polychloroalicyclic compounds and, more specifically, to processes for the preparation and manufacture of chlorinated derivatives of monocyclic five carbon hydrocarbons in which all five carbons are contained in the ring, including such derivatives as tetrachlorocyclopentane, octachlorocyclopentene, and hexachlorocyclopentadiene.

In recent years the polychloro alicyclic compounds, and especially hexachlorocyclopentadiene, have acquired a continuously growing importance as chemical intermediates. Despite the fact that a number of processes can be utilized for the preparation of hexachlorocyclopentadiene, there has been no wholly satisfactory method for preparing this chloro-carbon on a commercial scale. The chlorination procedures which have in the past been employed for this purpose can be classified, roughly, into three groups.

The first of these is an adaptation of the process used by Straus, Kollek, and Heyn (Ber. 63B, 1868–85 (1930)). Essentially, the Straus procedure consists in reacting cyclopentadiene with an alkaline solution of sodium hypochlorite. While this method of preparation can be utilized commercially on a large scale, it is seriously defective in the fact that the desired chlorinated diene is obtained only in a yield of approximately 50 percent, together with a variety of other halogenated compounds which are so reactive as to render attempts to separate hexachlorocyclopentadiene from the mixture in pure form almost wholly futile.

A second procedure for preparing hexachlorocyclopentadiene is a complex multi-step synthesis devised by Prinz. While, under the best circumstances, this process can lead to hexachlorocyclopentadiene in yields of approximately 63 percent, it is far too complex a procedure to warrant commercial exploitation. Moreover, certain steps in the procedure appear, on the basis of the chemical literature, poorly adaptable to economical commercial operation. This is particularly true of the final step in the synthesis, which consists in the dechlorination of octachlorocyclopentene. The present state of the art with respect to this operation has recently been illustrated by Krynitsky and Bosh (J. Am. Chem. Soc., 69, 1919, (1947)), who, using this process, required several days to carry out this last step, starting with approximately ten and one-half pounds of octachlorocyclopentene; and despite the slow rate of reaction thus employed, the conversion of the chlorinated cyclopentene to the desired diene occurred only to an extent of approximately 75 percent. Moreover, these investigators apparently found it necessary to dilute the octachlorocyclopentene with carbon tetrachloride.

Thirdly and more recently, McBee and Baranauckas (Ind. Eng. Chem., 41, 806–809 (1949)) have reported a process for the production of hexachlorocyclopentadiene which involves first the photochemical chlorination of pentanes and the subsequent chlorinolysis of these primary products, in the presence of five to six moles of chlorine for each mole of polychloropentane chlorinolyzed. Under the best circumstances, a 75 percent yield of the desired diene was obtained, but this required the relatively scarce cyclopentane as the starting material. The above process produces in addition a large variety of other chloro-carbons as by-products, of which those possessing obvious usefulness are materials of low unit value while others have no apparent present markets. From an operational standpoint, the overall process requires the use of radiant energy and apparatus capable of handling large amounts of gaseous chlorine at temperatures of almost 1000° F. Both of these requirements present difficulties which contribute unduly to the cost of the desired chlorinated diene.

Among the objects of this invention are to provide a novel process for producing chlorinated derivatives of monocyclic five carbon hydrocarbons in which all five carbon atoms are in the ring; to provide a novel process for producing hexachlorocyclopentadiene; to provide such a process in which the various steps produce intermediates useful in and of themselves, such as tetrachlorocyclopentane and octachlorocyclopentene; to provide a novel process for producing hexachlorocyclopentadiene from octachlorocyclopentene, which may also form a step in the production of hexachlorocyclopentadiene from tetrachlorocyclopentane or from cyclopentadiene or other five carbon cyclic hydrocarbons; to provide a novel process, which again may form a step in the production of hexachlorocyclopentadiene, for producing tetrachlorocyclopentane from cyclopentadiene or other five carbon cyclic hydrocarbon; to provide a novel process, which may also form another step in the production of hexachlorocyclopentadiene, for producing octachlorocyclopentene from tetrachlorocyclopentane; to provide such processes which involve relatively simple reactions, produce high yields, and do not produce an objectionable variety of chloro-carbon by-products; to provide such processes which can be economically carried out on a commercial scale and under conditions readily obtained in commercial practice; to provide such processes, the operating conditions of which do not impose unusual difficulties or time consuming and unduly expensive steps; to provide such processes including more than one step which may be carried out continuously, rather than by batch operations, although adaptable to the latter; and to provide certain novel compositions of matter, adapted to be produced by a process of this invention.

Other objects, features, capabilities, and advantages are comprehended by the invention, as will later appear and as are inherently possessed thereby.

Any of the cyclic five-carbon atom hydrocarbons, or their simple chlorinated derivatives, may serve as starting materials for the process of the present invention. The starting substances which may be used thus include cyclopentane, cyclopentene, cyclopentadiene and their simple chlorinated derivatives. Thus, with cyclopentadiene as a starting material, our process may include the following steps: (a) the chlorination of cyclopentadiene at temperatures between approximately —50° and 80° C. to produce tetrachlorocycyopentane; (b) the further chlorination of the thus obtained tetrachlorocyclopentane at controlled temperatures between 170° to 295° C. to produce octachlorocyclopentene; and (c) the pyrolysis of octachlorocyclopentene at temperatures between 275° and 500° C. to produce hexachlorocyclopentadiene, the desired chlorinated diene.

Embodied in the new process of this invention, as hereinabove set forth, are additional discoveries, each of which represents a substantial advance over the prior art. The nature of these advances will be more specifically elucidated in the paragraphs which follow.

The chemical literature indicates that cyclopentadiene will add two moles of chlorine to yield a tetrachlorocyclopentane, but it also indicates that this reaction must be carried out at temperatures below 0° and preferably at temperatures below −10° C., with the cyclopentadiene well diluted in an inert solvent such as carbon tetrachloride. Little data are available which indicate the yield of tetrachlorocyclopentane obtianed under these conditions but, in general, when the reaction is carried out in the manner indicated, tetrachlorocyclopentane can be obtained, under the best circumstances, in yields of approximately 70 percent together with a variety of high-boiling products. Using the conditions generally indicated, namely the addition of chlorine gas to a solution of cyclopentadiene in an inert solvent while maintaining a low temperature, the reaction solution ordinarily becomes very dark and in addition to tetrachlorocyclopentane, highly reactive, thermally-unstable materials are formed.

By the process of this invention, the production of undesirable reactive by-products was substantially eliminated by inverting the usual order of addition of the reagents: thus, when to a cold solution saturated with chlorine, cyclopentadiene was slowly added, tetrachlorocyclopentane was obtained in a good yield and free of undesired reactive contaminants, if the reaction solution was kept saturated with chlorine gas at all times during the course of the reaction. Even more significant was the discovery that the same general results were obtained at temperatures as high at least at 80° C., if the reaction solution was at all times saturated with chlorine and the cyclopentadiene was added to the chlorine saturated solution. It was also discovered that the chlorinated cyclopentane obtained as a product as a result of this reaction served admirably as a solvent for the reaction, and hence that a diluent such as carbon tetrachloride was unnecessary.

Since the addition of chlorine to the double bonds of cyclopentadiene results in the evolution of relatively large quantities of heat, the elimination of the requirement of a low temperature for the reaction permits this method of preparation to be carried out feasibly on a commercial scale. Without the elimination of the low temperature requirement, the cost of removing, at temperatures below 0° C., the large quantities of heat evolved makes this step of the process prohibitively expensive.

It should be noted that the term "tetrachlorocyclopentane" as it has hereinbefore been employed, and as it will be used hereinafter, refers not specifically to the compound $C_5H_6Cl_4$, but rather to a mixture comprised predominantly of the compounds $C_5H_6Cl_4$ and $C_5H_5Cl_5$ and having an average composition of $C_5H_{6-x}Cl_{5+x}$, $x$ varying from 0 to 1. The higher the temperature at which the chlorination of cyclopentadiene was effected, the more closely the average composition approached $C_5H_5Cl_5$ and, conversely, the lower the temperature at which the initial addition of chlorine was accomplished the more closely did the average composition approach $C_5H_6Cl_4$. It was, in fact, found that if the addition of chlorine to the reaction mixture was prolonged, after the completion of the addition of cyclopentadiene thereto, the average composition could be driven in the direction of $C_5H_4Cl_6$. However, an increase in chlorine content above that of the composition $C_5H_5Cl_5$ was obtained, at temperatures of 80° C. or less, extremely slowly. For practical purposes, therefore, chlorination beyond $C_5H_5Cl_5$ is a factor of little importance either for the first step or for the ensuing steps. It is, however, noteworthy that some chlorination beyond $C_5H_6Cl_4$ occurred even when the first step reaction was conducted at 0° C.

That tetrachlorocyclopentane, as that term herein is used, is more highly chlorinated than the compound $C_5H_6Cl_4$ is, from the present viewpoint, beneficial rather than detrimental. This becomes immediately apparent when consideration is given to the fact that the second step in the process of this invention has, as its object, the conversion of tetrachlorocyclopentane to octachlorocyclopentene; it follows, therefore, that increased chlorination in the first step serves to reduce the amount of reaction which must be accomplished in the second step.

Another major advance over the prior art lies in the discovery that tetrachlorocyclopentane can be readily further chlorinated to yield octachlorocyclopentene.

The fact that octachlorocyclopentene had never, prior to the present invention, been prepared by simple direct chlorination procedures was not because of any lack of interest in the compound. This is clearly evidenced by the work of Krynitsky and Bosh (previously cited) who resorted to relatively complex synthetic methods in order to prepare large quantities of the material. The difficulty lay rather in a lack of knowledge among those skilled in the art of means which might be employed to obtain, by uncomplicated direct chlorination processes, a good yield of a highly chlorinated hydrocarbon from one of low chlorine content. The condition of the art prior to this invention is perhaps best illustrated by the statement of McBee and Devaney (Ind. Eng. Chem., 41, 803 (1949)), as follows:

"The chlorination of hydrocarbons has been the subject of extensive study and several processes of varying efficiency have been reported for the production of polychloro compounds. One of the chief difficulties encountered in prior processes was maintaining adequate control of reaction temperatures. Under conditions required to obtain a satisfactory rate and degree of chlorination, the temperature, if not properly controlled, reaches a point where burning is encountered over a wide range of reactant concentrations. Concentrations of reactants outside the ranges in which explosions or burning can occur are generally unsatisfactory for large scale production of polychloro compounds, . . ."

Attempts further to chlorinate tetrachlorocyclopentane by slowly adding gaseous chlorine thereto (the usual procedure) confirmed the fact that the further addition of chlorine at temperatures of approximately 150° C. was so slow as to render such a procedure impracticable. Raising the temperature of the reaction mixture to the vicinity of 175° C. (the boiling point of the tetrachlorocyclopentane) did lead to further chlorination; however, the reaction proceeded with the simultaneous degradation of the reaction product so that there was finally obtained a partially carbonized crude product which contained appreciable amounts of highly reactive chlorinated hydrocarbons which rendered subsequent purification of the more highly chlorinated cyclopentanes almost impossible.

Contrary to the general teachings of the prior art, which the above-described results would appear to affirm, it was discovered, however, that the further chlorination of tetrachlorocyclopentane could be carried out in liquid phase to yield octachlorocyclopentene practically quantitatively if the rate of chlorine introduction was maintained sufficiently high to insure constant saturation of the chlorination mixture with chlorine, and provided that the temperature was not permitted to rise unduly.

As the chlorine content of the tetrachlorocyclopentane increased, the material became increasingly resistant to further chlorination and increasing temperatures were therefore required to maintain the chlorination rate. It was also found that as chlorination progressed, the resistance of the intermediate polychlorocyclopentanes to undesirable degradative changes also increased so that the polychlorocyclopentanes could successfully be further chlorinated at a useful rate at their boiling points which, of course, rose as the chlorine content increased. Moreover, this progressive chlorination could be carried completely to octachlorocyclopentene without undesirable degradation of the quality of the product, if the rate of chlorine introduction was maintained sufficiently high to insure constant saturation of the reaction mixture with chlorine.

Again in marked contrast to the general teaching of the prior art, it was found that the maintenance of suitable temperatures presented no insurmountable difficulty: the finding that the progressive chlorination of polychlorocyclopentanes proceeded at reasonable rates at the boiling point of the solution undergoing chlorination provides, in simple fashion, the long-sought solution. The avoidance of unduly high temperatures despite the high exothermicity of the reactions involved, was readily accomplished by working in liquid phase at the boiling point of the reacton mixture in equipment capable of refluxing the boiling solution. Thus, the heat of chlorination was continuously utilized to aid in boiling the reaction mixture and thus dissipated. It is clear, of course, that the temperature at which chlorination was effected was the required constantly rising temperature, since the boiling point of the solution increased as the chlorine content of the reaction product increased. Furthermore, as discussed in greater detail later, it was found that the progressive temperature rise, when controlled to produce the desired results, lay within approximately 10° to 20° C. of the temperature at which the mixture undergoing chlorination refluxed when, at atmospheric pressure, it was continuously saturated with chlorine. Thus, whether temperature control is to be effected in the manner described above or in any other manner, a suitable guide to the control and also simple tests for determining the desired temperature range for any point of the chlorination procedure, is provided.

For the sake of clarity, the meaning of the term "polychlorocyclopentane," as used herein, should be defined. As herein employed, the term "polychlorocyclopentane" denotes the mixture of reaction products obtained by further chlorination of tetrachlorocyclopentane; octachlorocyclopentene is specifically denoted as such and is not included within the term polychlorocyclopentane. This unusual usage is dictated by the fact that the further chlorination of tetrachlorocyclopentane leads, before the attainment of the ultimate product composition, to a mixture of chlorinated cyclopentenes and chlorinated cyclopentanes. Since no need exists to differentiate between these two types of compounds, and since no term generic to both types exists, the use of polychlorocyclopentane for both has been adopted.

Another advance over the art, in the process of this invention, lies in the discovery that the dechlorination of octachlorocyclopentene to hexachlorocyclopentadiene occurred not at a very slow rate, as is indicated in the chemical literature, but rather at a very rapid rate. It was found that at any temperature above the boiling point of octachlorocyclopentene, the three components of the system consisting of hexachlorocyclopentadiene, octachlorocyclopentene, and chlorine acted as though a chemical equilibrium were involved; the rate at which octachlorocyclopentene gave the apparent equilibrium mixture was, in fact, very rapid requiring only minutes at approximately 300° C. and only fractions of a minute at 400° C. or temperatures slightly above that. This being the case, the quantititative conversion of octachlorocyclopentene to hexachlorocyclopentadiene was very readily accomplished in a continuous-flow pyrolytic system, so arranged that the mixture of products obtained from the cracking tubes could be fractionated with recovery of the hexachlorocyclopentadiene as the desired product, and the unchanged octachlorocyclopentene could be recycled to the cracking tubes. Since at any temperature in the range 350° to 450° C., the actual reaction rate was very rapid, the temperature could be selected in order to provide minimum loss of the octachlorocyclopentene to undesirable by-products and operating conditions feasible for materials of construction commercially available. Since the amount of octachlorocyclopentene which must be recycled increased as the cracking temperature was lowered, it is economically desirable to set the cracking temperature at the maximum value, consistent with the requirement that high yields of hexachlorocyclopentadiene be obtained and the concomitant production of other compounds be avoided. As has already been noted, it was found that at temperatures in the vicinity of 400° C., the conversion of octachlorocyclopentene to hexachlorocyclopentadiene could be accomplished almost quantitatively with no significant loss of material to undesired by-products: at this temperature, the amount of octachlorocyclopentene which must be recycled was small and imposed no excessive loss of economy on the process. The fact that the pyrolytic process results in a mixture which contains a relatively low concentration of free chlorine (in contrast to previous chlorinolysis procedures which require high concentrations of free chlorine), coupled with the requirement that temperatures need not exceed 450° C., make possible the use of ordinary available materials for plant construction.

While the foregoing discussion of the various steps of the process of this invention serve adequately to demonstrate the major advances over the prior art which are involved and to explain why, for the first time, the new process permits the economical production of hexachlorocyclopentadiene, it does not wholly set forth all of the significant aspects of the new process. In order to do so, it will be necessary to discuss in somewhat greater detail other phases of the first two steps of the process.

Superficially, it would appear that operationally the conversion of cyclopentadiene (and cyclopentene or cyclopentane) to octachlorocyclopentene is essentially a one-step procedure, since the reaction involved is the addition of chlorine at constantly increasing temperatures. Actually, however, there is a distinct physical difference between the chlorination to produce the first step product, tetrachlorocyclopentane, and the second step product which is obtained from the first step material by further chlorination. The initial reaction to produce tetrachlorocylopentane proceeded extremely rapidly even at temperatures in the vicinity of 0° C. and was, of course, highly exothermic. The subsequent chlorination of this primary product did not proceed appreciably until its boiling point (approximately 170° C.) was reached; while the subsequent chlorination remained highly exothermic it was, even at the elevated temperature necessary to cause it to proceed, relatively slow. Consequently, the conditions which must be maintained in order to achieve the desired end changed appreciably after tetrachlorocyclopentane had been produced: the first reaction required only that adequate cooling be provided and that such precautions be taken as were necessary to avoid an undue rise in temperature. The subsequent chlorination of the tetrachlorocyclopentane to octachlorocyclopentene required that the temperature be maintained at approximately the boiling point of the material undergoing chlorination while removing, at that somewhat elevated temperature, the heat of reaction in order that undesirable temperature rise might be avoided without, in so doing, cooling the reaction mixture sufficiently to stop the desired chlorination reaction. Consequently, the division of the overall chlorination process into two steps is both necessary and logical.

As has already been noted, the progressive chlorination of tetrachlorocyclopentane to octachlorocyclopentene has successfully been accomplished by conducting the chlorination at the boiling point of the reaction mixture (which rose as the chlorination proceeded) under conditions which insured constant saturation of the reaction mixture with free chlorine. This reaction step occurred sufficiently rapidly to permit a wholly feasible commercial operation, but not rapidly enough to make the resulting operation wholly desirable. Fortunately, there were found two ways of obviating the problem thus presented; in one of the reactions, a catalyst was utilized to increase the speed of the reaction, while the other accomplished an identical result without the use of a catalyst.

It was discovered that the second step reaction rate was markedly increased in the presence of approximately one percent of phosphorous pentachloride. As a result, under the general conditions previously indicated, the conversion of tetrachlorocyclopentane to octachlorocyclopentene could be accomplished in markedly shorter periods of time. Unfortunately, however, when the relatively volatile phosphorous pentachloride was used as catalyst for the reaction, conducted at substantially atmospheric pressure, special precautions were required to prevent its loss, since it tended to pass from the reaction mixture with the large quantities of hydrogen chloride formed during the reaction.

It was also discovered that arsenic oxide acted as an equally effective catalyst for the conversion of tetrachlorocyclopentane to octachlorocyclopentene. It appears probable that the effective catalyst was actually arsenic chloride, obtained by the action of hydrogen chloride on the oxide originally added. However, regardless of whether the actual catalyst was the added arsenic oxide or the chloride derived therefrom, the fact remains that the addition of arsenic oxides served to provide a catalyst for the reaction which avoided the operational complications introduced through the use of phosphorous pentachloride.

While the volatility of phosphorous pentachloride makes its employment somewhat more difficult than the employment of arsenic oxide as the catalyst for the reaction, it is of course obvious that the commercial design of equipment, which will effect the separation of phosphorous pentachloride from the hydrogen chloride leaving the system and return it to the chlorination reaction mixture, is readily possible. Alternatively, the loss of phosphorous pentachloride from the system can be substatially avoided by raising the pressure of the second step chlorination process. Thus, either of the catalysts discovered can be used to shorten the time required for the second step of the new process. However, the use of a catalyst does not represent a completely satisfactory solution to the problem, inasmuch as the use of a catalyst requires its ultimate separation from the reaction product, in order that the catalyst be conserved and contamination of the final product be avoided.

An alternative approach to the problem of increasing the reaction rate of the second step was sought in attempts to change the overall conditions under which that step is effected. In general, the rate of a chemical reaction increases with rising temperature, but since, in the present case, the normal atmospheric boiling point of the material undergoing chlorination represents an approximate upper temperature limit for the chlorination reaction, increasing temperature could not be used to advance reaction rate.

While the nature of the reaction precludes raising the reaction temperature, it was found that increasing the pressure of chlorine gas over the mixture undergoing chlorination significantly enhanced the reaction rate without degrading the quality of the desired product. Investigation of the beneficial results thus obtained demonstrated that when the chlorine pressure was raised to approximately 200 pounds per square inch or higher, the second step reaction became sufficiently rapid to permit continuous flow operation. Consequently, the simple expedient of raising the chlorine pressure in the second step reaction effectively eliminated any difficulties which might otherwise have been created by a relatively slow reaction.

It should further be noted that increasing the chlorination pressure was advantageous from another standpoint than that of increasing reaction rate. It will be recalled that a prime requisite, if a clean product was to be obtained, for chlorination at temperatures approximating those of the boiling point of the chlorination mixture, was found to be that the reaction solution, at all times, should be saturated with respect to chlorine. This imposition of saturation conditions was, of course, for a reaction carried out at atmospheric pressure; it follows that if the pressure of chlorine over the reaction mixture is raised to approximately 200 pounds per square inch or higher, complete saturation of the solution at the necessary level is easily assured. It is particularly important to note that increasing the saturation of the reacting solution with respect to chlorine did not markedly, if at all, increase the upper temperature limit at which satisfactory chlorination could be obtained. It is, therefore, necessary that the chlorination at super-atmospheric pressures be conducted under carefully controlled temperature conditions. It is clear, of course, that at pressures above atmospheric it is not possible to depend, for temperature control, upon heat dissipated through refluxing of the reaction solution since the increase in boiling point, brought about by increased pressure, raises the reflux temperature above that which may safely be employed.

The full importance of the discovery, already hereinabove set forth, that the atmospheric boiling point of the chlorination mixture undergoing reaction represented the temperature at which further chlorination could be accomplished without degradation of the reaction product or of the reacting components, became evident. In contrast to the lack of information until now available in the art, it is possible to indicate the temperature levels at which the reaction must be controlled in order successfully to obtain octachlorocyclopentene from less highly chlorinated cyclic five carbon atom hydrocarbons by direct chlorination of the latter at super-atmospheric pressures.

In general, and as previously indicated, the temperatures at which the reaction mixture undergoing chlorination at elevated pressure should be held is the temperature at which that chloro-hydrocarbon mixture would reflux at atmospheric pressure when saturated with elemental chlorine. It should be understood that the reflux temperature herein discussed is the temperature of the body of boiling liquid and not the temperature of the condensing vapor. While it is not necessary that the temperature of the reaction mixture be exactly that at which it would boil under the above-described conditions it is undesirable that it exceed that temperature by more than twenty degrees centigrade, and preferable that its upper temperature limit be within ten degrees centigrade of that specified temperature. Of course, temperatures below the reflux temperature of the mixture will not cause degradation of the product but will ordinarily be avoided because of their adverse effect on reaction rate.

The change in reaction temperature required (or the change in reflux temperature which occurred in the reaction conducted in the presence of an excess of chlorine, maintained by the continuous flow of chlorine gas into and through the reaction mixture, at atmospheric pressure at Denver, Colorado) as the reaction progresses as illustrated by the curve of the figure, in which the temperature of the boiling mixture is plotted against time. The temperature data used for this purpose were taken from a number of segmental runs, and the values are, therefore, to be considered illustrative only and not as exact representations of the observations obtained during the course of the conversion of a given batch of tetrachlorocyclopentane to octachlorocyclopentene.

Examination of the figure shows that the abscissa is also calibrated in terms of reaction completion. The experimental data for the plot were obtained from operations which required approximately twenty hours for the chlorination of tetrachlorocyclopentane to octachlorocyclopentene to be complete. However, our data indicate that the reflux temperature obtained as the atmospheric reaction proceeds is determined by the degree of completion which has already been achieved in the chlorination reaction. It follows, therefore, that the plot of temperature vs. percent of reaction completion is, in fact, preferable for consideration of the pertinent data. Moreover, it possesses the advantage of being independent of the time required for reaction completion, and hence is broadly applicable regardless of the pressure employed for the second chlorination step.

The actual means which may be utilized to carry out the process of this invention can be understood more easily by consideration of actual examples which show how the desired results of each of the steps of the process have been achieved. Toward this end, a number of examples which illustrate the steps in the process are given hereinafter. It should, of course, be understood that these examples are illustrative only and are in no wise to be taken as limiting the scope of our invention.

Example I shows how tetrachlorocyclopentane was prepared from cyclopentadiene.

Example I

A one liter three-necked flask was fitted with a gas dispersion tube, a motor driven stirrer, a reflux condenser and a small diameter inlet tube which reached almost to the bottom of the flask. The flask was surrounded by an acetone bath which was cooled by the intermittent addition of Dry Ice, at such a rate as was required to maintain the reacting solution at a temperature of 50° C. The flask was charged with 443.7 g. of tetrachlorocyclopentane having a chlorine content of 72.8%; this material served as a solvent for the reaction. The solvent was saturated with chlorine by introducing the latter through the gas dispersion tube with the stirrer operating at high speed; after saturation was achieved, the introduction of cyclopentadiene was begun, without interrupting either the stirring or the admission of chlorine gas to the reaction system. The hydrocarbon was pumped into the flask, using a small positive displacement pump which introduced the cyclopentadiene below the surface of the liquid in the flask, through the small diameter inlet tube. The rate at which the hydrocarbon was introduced was adjusted so that, with the cooling available, the temperature of the reaction mixture did not exceed 50° C. The reaction was stopped after the addition of 480.0 g. of cyclopentadiene. There was thus obtained a total of 2108.9 g. of tetrachlorocyclopentane having a chlorine content of 72.2%. This corresponds to a total of 1665.2 g. of tetrachlorocyclopentane with a chlorine content of 72.0% obtained from the added cyclopentadiene. The tetrachlorocyclopentane produced in this fashion had an average composition which may be represented as $C_5H_{5.37}Cl_{4.73}$: the yield was 98.9% of theoretical.

Examples II, III and IV illustrate the conversion of tetrachlorocyclopentane to octachlorocyclopentene. Examples II and III show the use of catalyts for this conversion, while Example IV demonstrates an uncatalyzed conversion.

Example II

The apparatus employed was similar to that utilized in Example I, except that no small diameter inlet tube was provided and a heating mantle was substituted for the cooling bath previously used. 700 g. of the product obtained in Example I was charged to the flask, 7 g. of arsenic trioxide was added thereto, the introduction of chlorine gas was begun and the motor driven stirrer was started. The reaction mixture was maintained at a gentle reflux for eleven hours, after which the mixture was permitted to cool to room temperature; the introduction of chlorine was continued until the temperature of the reaction mixture had been markedly lowered. During the course of the reflux period, the temperature of the boiling reaction mixture increased from approximately 175° to approximately 275° C. After being freed of dissolved, unreacted chlorine, the crude reaction product, which crystallized almost completely, weighed 1059.4 g. and contained 82.2% of chlorine (calculated for $C_5Cl_8$; Cl=82.56%). Distillation of this crude product at 0.4 mm. Hg abs. led to the recovery of 1012.3 g. of octachlorocyclopentene boiling between 94°–98° C. This was 98.6% of the amount required by theory, based on a calculated average composition of $C_5H_{5.23}Cl_{4.77}$ for the starting material.

Example III

Both the apparatus and the procedure employed were the same as those indicated in Example II. The charge of tetrachlorocyclopentane however, was 2477.0 g., and 49 g. of phosphorous pentachloride was introduced as a catalyst. The time required for completion of the reaction was thirty-one hours.

Example IV

The apparatus and procedure were substantially identical with those of Examples II and III. No catalyst was employed and the charge of tetrachlorocyclopentane was reduced to 795.5 g. The time required for the completion of the reaction was thirty-nine hours (completion measured, as in the previous cases by attainment of a reaction mixture boiling temperature of 275° C.). There was thus obtained 1006.2 g. of crude product. Distillation at reduced pressure resulted in the separation of 741.6 g. of material in the octachlorocyclopentene boiling range which, on analysis, showed a chlorine content of 83.2% (calculated for $C_5Cl_8$; Cl=82.56%) and 264.6 g. of higher boiling material.

Example V illustrates the conversion of octachlorocyclopentene to hexachlorocyclopentadiene.

Example V

The 1012.3 g. of distilled octachlorocyclopentene obtained in Example II was pumped to a pyrolysis tube which consisted of a length of 20 mm. Pyrex tubing heated over a portion of its length by an electrically heated furnace. The length of the heated zone was approximately 11 inches. The muffle of the furnace was heated to a maximum temperature of 500° C.; the temperature attained by the vapors passing through the pyrolysis zone was, therefore, somewhat less than 500° C. The vapors issuing from the cracking tube were condensed and the resulting liquid was fractionated to recover the desired hexachlorocyclopentadiene, while the higher boiling bottoms remaining from the fractionation were recharged to the furnace. This cycle was continued until the amount of bottoms obtained was too small to permit further cracking operation. After three or four such cycles had been completed, there were left 48.1 g. of bottoms, an amount insufficient to enable further recycling. These bottoms were light in color and crystallized completely and thus were assumed to be unconverted octachlorocyclopentene. The pure hexachlorocyclopentadiene recovered by fractionation (boiling range, 68–70° C. at 1.0–1.3 mm. Hg abs.) weighed 744.0 g.; it resulted from the pyrolysis of 1012.3−48.1=964.2 g. of $C_5Cl_8$. The theoretical recovery of $C_5Cl_6$ from this amount of starting material is 765.2 g. The yield was, therefore, 97.2% of the theoretical.

It should be noted that the overall yield of hexachlorocyclopentadiene from cyclopentadiene obtained by utilizing the three steps of our new process as illustrated by Examples I, II and V was (98.9×98.6×97.2)%=94.7% of that theoretically obtainable.

Example VI illustrates the fact that the pyrolytic conversion of octachlorocyclopentene to hexachlorocyclopentadiene occurred rapidly and, further, that under the conditions employed the extent of the conversion was largely independent of the residence time of the material in the pyrolysis zone but markedly dependent on the temperature at which the pyrolytic reaction was conducted.

Example VI

The apparatus employed for the development of the data in the table below consisted of a vertically oriented 20 mm. Pyrex tube, connected at its lower end to a boiling flask and passing through an electrically heated furnace with a heated zone approximately eleven inches long. Vapors from the tube passed to an appropriate condensing and collecting system. The rate at which the octachlorocyclopentene passed through the pyrolysis zone was controlled by adjusting the boil-up rate of the material from the boiling flask. The temperatures given in the table are the temperatures of the vapors leaving the cracking zone. The determination of hexachlorocyclopentadiene in the cracked product was effected by fractionation of the crude product in vacuo.

| Temperature, °C. | Residence time (seconds) | Percent conversion to $C_5Cl_6$ |
|---|---|---|
| 487 | 6.5 | 80 |
|  | 11.0 | 79 |
|  | 29.0 | 81 |
|  | 39.0 | 82 |
| 444 | 6.0 | 48 |
|  | 50.0 | 59 |
| 424 | 82.0 | 68 |
| 393 | 4.5 | 31 |
| 380 | 48.0 | 31 |
|  | 74.0 | 38 |

The data of Example IV illustrate a point of interest which deserves some comment. The uncatalyzed second step chlorination reaction carried out at atmospheric pressure was not only slower than the catalyzed reaction but produced a crude material (which crystallized almost completely) having an analysis corresponding to the empirical formula $C_5Cl_9$. Such a molecule is, of course, unlikely and the data can best be interpreted by means of the assumption that the product obtained is an approximately equi-molecular mixture of $C_5Cl_8$ or octachlorocyclopentene, and $C_5Cl_{10}$ or decachlorocyclopentane. This latter compound has never previously been prepared. In view of the fact that octachlorocyclopentene shows appreciable thermal instability, it would be expected that the decachlorocyclopentane would be markedly unstable. Our experiments indicated that the crude product analyzing for $C_5Cl_9$ could be completely converted to hexachlorocyclopentadiene in the same manner as can octachlorocyclopentene, a fact which tends to support our hypothesis as to the nature of the product. The material $C_5Cl_9$ showed a melting point somewhat higher than that of octachlorocyclopentene: however, repeated recrystallizations of this material led to the recovery of crystalline octachlorocyclopentene only, but this was not surprising in view of the expected instability of the decachloro compound.

While the mixture having an empirical formula corresponding to $C_5Cl_9$ is, in fact, a new composition of matter different from octachlorocyclopentene it is, in general, not separately treated in this specification because, as an intermediate in the preparation of hexachlorocyclopentadiene, its properties do not require that it be differentiated from octachlorocyclopentene. Consequently, where the preparation of octachlorocyclopentene as an intermediate for the preparation of hexachlorocyclopentadiene is specified herein and in the claims which follow, it is to be understood that such terminology encompasses both the substance octachlorocyclopentene and the mixture having an empirical formula corresponding to $C_5Cl_9$.

Obvious variations, at once apparent to those skilled in the art, in carrying out the various steps of the process of this invention are of course possible, all of which are comprehended within the scope of this invention. It was possible, for example, to mix liquid chlorine with tetrachlorocyclopentane in a mole ratio of at least five and one-half ($Cl_2$) to one under sufficient pressure to maintain all of the chlorine in the liquid phase and cause the resulting mixture to pass successively through three reaction coils connected in series and maintained, by immersion in salt baths, at progressively higher temperatures such, for example, as 220°, 240° and 275° C., and recover substantially pure octachlorocyclopentene admixed with chlorine at the outlet of the last reaction zone.

The tetrachlorocyclopentane employed, as indicated above, can readily be obtained by adding chlorine and cyclopentadiene in a mole ratio of at least three and one-half to a large volume of circulating solution maintained at a temperature in the range of 50° to 80° C. and a pressure lying within the range of atmospheric to 500 pounds per square inch gauge under conditions such that the mole ratio of chlorine to tetrachlorocyclopentane in the circulating medium is approximately one-half to one or greater. The solvent for such a reaction process can be any material unreactive with chlorine under the conditions of the reaction process. Thus, for example, carbon tetrachloride can be employed, but, as is obvious, tetrachlorocyclopentane itself can very advantageously be utilized as the solvent.

Similarly, the process can effectively be carried out by adding both chlorine and cyclopentadiene in a mole ratio of at least seven to one, to a relatively large volume of a solvent which is rapidly recirculated through heat exchangers. This solvent can be carbon tetrachloride or any other material which is inert to chlorine under the conditions of the reaction, but most advantageously, it may be tetrachlorocyclopentane. The ratio of chlorine to tetrachlorocyclopentane in the circulating solution should be at least four to one and the pressure on the system adequate to maintain the chlorine substantially in liquid phase. Preferably, the pressure should be of the order of 275–350 pounds per square inch gauge, but it may lie anywhere within the range of 0 to 500 pounds per square inch gauge. Under these conditions, the first step reaction temperature may lie between −50° and 80° C.

Employing a first step operation similar to that described immediately above, the second step can readily be accomplished by passing the mixture of tetrachlorocyclopentane and chlorine in a mole ratio of chlorine to hydrocarbon of at least four to one, as it is formed, to a second step reactor which takes the form of a once through, temperature controlled heat exchanger, in which the controlled temperature is made to conform, within ±20° C. and preferably within ±10° C., approximately to the heating curve shown in the figure. The pressure in the second step reactor will under these circumstances, except for reduction due to pressure drop, be the same as that employed in the first step reactor.

By applying the teachings of this disclosure it is at once apparent that the proper temperature for any and every zone within the second step reactor can readily be exactly determined by withdrawing a sample of the mixture present in that zone and determining, by the procedure and under the conditions previously herein described, the boiling temperature of that mixture at atmospheric reflux.

The mixture of octachlorocyclopentene and chlorine obtained from the second step reactor may then be passed to a gas separator where any unreacted chlorine and hydrogen chloride formed in the reaction, which are separable at the reaction pressure, can be passed to an appropriate recovery system. The octachlorocyclopentene still containing dissolved gases may then be passed through a pressure reducing valve to a second gas separator, in which the remaining dissolved gas may be almost completely separated.

The crude octachlorocyclopentene thus obtained may be pumped at a pressure of about five pounds per square inch gauge to a cracking zone so arranged that the crude cracked vapors are routed to a fractionating system, which serves to separate pure hexachlorocyclopentadiene from unconverted octachlorocyclopentene. The unconverted cracking stock can, of course, advantageously be recycled through the pyrolysis zone.

In still another embodiment of the teachings of this invention, tetrachlorocyclopentane can be obtained by adding chlorine and cyclopentadiene in a mole ratio of at least three and one-half to one to a large volume of circulating solution maintained at a temperature in the range of atmospheric to 150 pounds per square inch gauge, but somewhat more conveniently between 25 to 125 pounds per square inch gauge under conditions such that the mole ratio of chlorine to tetrachlorocyclopentane in the circulating medium is approximately one-half to one or greater. Here again, tetrachlorocyclopentane can advantageously be utilized as the reaction solvent.

The tetrachlorocyclopentane thus obtained can be passed to a gas separator, in order to remove hydrogen chloride and any separable chlorine and the degassed liquid may then be pumped, together with chlorine, in a mole ratio of at least four and one-half moles of chlorine ($Cl_2$) to one mole of tetrachlorocyclopentane, to a controlled temperature reactor in order to convert the tetrachlorocyclopentane to octachlorocyclopentene. The second step reactor and the temperature and pressure relationships maintained therein may be substantially similar to those previously described herein. However, if the last described process or one similar to it is utilized, the pressure employed in the second step reactor may vary widely from that employed in manufacturing the tetrachlorocyclopentane.

Other modifications of this invention will also be readily apparent to workers skilled in this field. In this connection, it is clear that each of the steps of the process of this invention may be used independently to produce, as an end product, that which it serves in the overall process to produce as an intermediate product. Thus, steps one and two may be used to produce octachlorocyclopentene from cyclopentadiene, or step two, by itself, may be used to produce octachlorocyclopentene from tetrachlorocyclopentane, regardless of the source of the latter material. It will therefore be understood that all such variations in the manner in which such separate steps are combined and employed are within the scope of this invention and fully comprehended by it.

Thus, substantial advantage resides in the use of tetrachlorocyclopentane as the chlorine-carrying solvent in executing the additive chlorination step of the invention wherein cyclopentadiene is chlorinated to a product comprising tetrachlorocyclopentane, for this material is not only produced within the system but is made available in a form containing elemental chlorine. When using this solvent a part of the crude liquid product, comprising product tetrachlorocyclopentane, which is formed in the cyclopentadiene additive chlorination step, is recycled to the additive chlorination to provide the necessary solvent. Similarly substantial advantage resides in carrying out the substitutive chlorination step of the process, wherein tetrachlorocyclopentane is chlorinated to octachlorocyclopentene, in the presence of solvent comprising octachlorocyclopentene. When the substitutive chlorination is executed in a reactor provided with reflux condensing means, liquid comprising octachlorocyclopentene is inherently continuously returned to the reaction mixture. In practical scale continous operation, such means as recycling a part of the crude liquid octachlorocyclopentene-containing product to the inlet of the substitutive chlorinating zone provides the equivalent advantageous condition assuring the presence of substantial amount of octachlorocyclopentene in the reaction mixture during the substitutive chlorination step. Another advantage inherent in the three-stage continuous process of the invention is the ability to utilize chlorine-containing side streams produced in the system as source of elemental chlorine for the chlorination steps. Thus, elemental chlorine produced in the octachlorocyclopentene pyrolysis step is advantageously recycled to the additive and/or substitutive chlorination step of the process.

Moreover, aside from their usefulness as intermediates for the preparation of hexachlorocyclopentadiene, both tetrachlorocyclopentane and octachlorocyclopentene are useful as intermediates in the preparation of a wide variety of other organic chemicals. Tetrachlorocyclopentane also has value as a solvent and cleaning agent. Octachlorocyclopentene, because of the ease with which it gives up a mole of chlorine, has added value as a chlorinating agent. The new composition having the empirical formula $C_5Cl_9$ has particular usefulness as a chlorinating agent, and also as a solid storage agent from which elemental chlorine may readily be obtained.

It is, of course, to be understood that the various examples herein given and the variations of the process which may be employed to utilize the discovery and realize the benefits which might be derived from it, as herein discussed, are intended to be illustrative only and in no sense limiting. This invention, in fact, comprehends all of the illustrative variations herein given and the many other variations which will be apparent to those skilled in the art, and is to be limited only by the following claims.

This application is a continuation-in-part of co-pending application Serial No. 190,194, filed October 14, 1950, now abandoned.

I claim as my invention:

1. A process for producing a chlorinated derivative of a monocyclic five carbon hydrocarbon in which all five carbon atoms are contained in the ring which comprises the liquid phase chlorination of cyclopentadiene at a temperature —50° and 80° C. and at a pressure lying between atmospheric and 500 pounds per square inch gauge, by adding chlorine and cyclopentadiene in a mole ratio of at least seven to one to a relatively large volume of a solution which contains elemental chlorine under conditions such that the molar ratio of chlorine to tetrachlorocyclopentane in the reaction system is at least four to one, to form tetrachlorocyclopentane; the further chlorination of the tetrachlorocyclopentane, substantially in liquid phase, at a controlled temperature which increases, as the chlorination proceeds, from approximately 170° to approximately 275° C., said further chlorination being effected by causing the mixture obtained in the chlorination of cyclopentadiene to tetrachlorocyclopentane to pass through a controlled temperature reactor, at a pressure lying between atmospheric and 500 pounds per square inch gauge, to form octachlorocyclopentane.

2. A process for producing octachlorocyclopentene which comprises the chlorination of cyclopentadiene at a temperature between —50° and 80° C. and at a pressure lying between atmospheric and 500 pounds per square inch gauge, by adding chlorine and cyclopentadiene in a mole ratio of at least three and one-half to one to a relatively large volume of a chlorinated hydrocarbon solvent which contains elemental chlorine under conditions such that the molar ratio of chlorine to tetrachlorocyclopentane in the reaction system is at least one-half to one, to form tetrachlorocyclopentane, then chlorinating the tetrachlorocyclopentane, substantially free of less chlorinated cyclopentanes and substantially in liquid phase, at a temperature which increases, as the chlorination proceeds, from approximately 170° to approximately 275° C., under conditions such that the mixture undergoing chlorination is at all times saturated with elemental chlorine, to form octachlorocyclopentene.

3. A process according to claim 2, wherein the molar ratio of chlorine to tetrachlorocyclopentane in the reaction system of the first step of the process is at least four to one and wherein the molar ratio of elemental chlorine to tetrachlorocyclopentane in the reaction system of the second step of the process is also at least four to one.

4. A process for producing octachlorocyclopentene which comprises the chlorination of tetrachlorocyclopentane, substantially free of less chlorinated cyclopentanes and substantially in liquid phase, at a temperature which increases, as the chlorination proceeds, from approximately 170° to approximately 275° C. under conditions such that the mixture undergoing chlorination is at all times saturated with elemental chlorine, to form octachlorocyclopentene.

5. The process according to claim 4 in which the chlorination of tetrachlorocyclopentene to octachlorocyclopentene is conducted in the presence of a catalyst.

6. The process according to claim 5 wherein the catalyst is selected from phosphorous pentachloride and arsenic trioxide.

7. A process for producing octachlorocyclopentene which comprises the chlorination of tetrachlorocyclopentane, substantially in liquid phase and substantially free of less chlorinated cyclopentanes, at a controlled temperature which increases, as the chlorination proceeds, from approximately 170° to approximately 275° C., said chlorination being effected by causing a mixture which contains elemental chlorine under conditions such that the molar ratio of chlorine to tetrachlorocyclopentane is at least four to one to pass through a controlled temperature reactor, at a pressure lying between atmospheric and 500 pounds per square inch gauge, to form octachlorocyclopentene.

8. The process for producing hexachlorocyclopentadiene from cyclopentadiene and chlorine which comprises the successive steps of introducing chlorine and cyclopentadiene together with a relatively large volume of chlorine-containing solution into a first reaction zone maintained at a temperature of from about −50° to about 80° C. and a pressure of from about atmospheric to about 500 pounds per square inch gauge under conditions such that the mole ratio of chlorine to cyclopentadiene introduced into said first reaction zone is at least about three and one half to one and the mole ratio of elementary chlorine to tetrachlorocyclopentane in said first reaction zone is at least about one-half to one, thereby additively chlorinating cyclopentadiene with the formation of a first crude liquid reaction mixture having a chlorine content substantially corresponding to that of tetrachlorocyclopentane in said first reaction zone, passing at least a part of said first crude liquid reaction mixture into a second reaction zone, substitutively chlorinating said first crude liquid reaction mixture in the liquid phase at a temperature of from about 170° to about 295° C., at a pressure of from about atmospheric to about 500 pounds per square inch gauge, in said second reaction zone, maintaining a progressively increasing temperature gradient through said second reaction zone thereby substitutively chlorinating said first crude liquid reaction mixture in said second reaction zone with the formation of a second crude liquid reaction mixture having a chlorine content substantially corresponding to that of octachlorocyclopentene in said second reaction zone, passing at least a part of said second crude liquid reaction mixture into a third reaction zone, pyrolyzing said second crude liquid reaction mixture in said third reaction zone at a temperature of from about 300° to about 500° C., thereby forming a third crude liquid reaction mixture having a chlorine content corresponding to that of hexachlorocyclopentadiene together with a gaseous elementary chlorine-containing product in said third reaction zone, and separating hexachlorocyclopentadiene from said third crude liquid reaction mixture.

9. The process for the production of hexachlorocyclopentadiene from cyclopentadiene and chlorine in accordance with claim 8 wherein a part of said first crude liquid reaction mixture having a chlorine content substantially corresponding to that of tetrachlorocyclopentane formed in said first reaction zone is recycled in said first reaction zone.

10. The process for the production of hexachlorocyclopentadiene from cyclopentadiene and chlorine in accordance with claim 8 wherein at least a part of said second crude liquid reaction mixture having a chlorine content substantially corresponding to that of octachlorocyclopentene formed in said second reaction zone is recycled in said second reaction zone.

11. The process for the production of hexachlorocyclopentadiene from cyclopentadiene and chlorine in accordance with claim 8 wherein elementary chlorine is separated from the effluence of said third reaction zone and recycled to said first reaction zone.

References Cited in the file of this patent

UNITED STATES PATENTS 2,509,160    McBee et al. _____ May 23, 1950

OTHER REFERENCES

Kraemer et al.: "Ber. der deut. chem. Gesell.," vol. 29, pp. 552–61 (1896).

Krynitsky et al.: "Jour. Amer. Chem. Soc.," vol. 69, pp. 1918–20 (1947).